(12) United States Patent
DeVito

(10) Patent No.: US 6,254,313 B1
(45) Date of Patent: Jul. 3, 2001

(54) TURNABLE TRACTOR VEHICLE HAVING FIXED AXLE

(76) Inventor: Angelo DeVito, 115 Brixton Rd., Garden City, NY (US) 11530

(*) Notice: Subject to any disclaimer, the term of this patent is extended or adjusted under 35 U.S.C. 154(b) by 0 days.

(21) Appl. No.: 09/342,446

(22) Filed: Jun. 29, 1999

(51) Int. Cl.$^7$ .............. B62D 51/04; B60S 9/14; A01B 69/00

(52) U.S. Cl. .............. 405/180; 180/19.1; 180/19.3; 280/47.11; 280/763.1; 172/40; 172/42; 172/80; 172/256

(58) Field of Search .............. 180/19.2, 13, 19.3, 180/19.1, 210; 280/763.1, 47.11; 172/40, 42, 43, 80, 13, 256; 37/242, 244; 56/16.7, 14.7; 405/180, 181

(56) References Cited

U.S. PATENT DOCUMENTS

| | | | |
|---|---|---|---|
| 2,367,466 | * | 1/1945 | Loy .............. 180/19.1 |
| 2,918,130 | * | 12/1959 | Thom .............. 172/43 |
| 3,891,043 | * | 6/1975 | Valdex .............. 180/19.1 |
| 3,960,231 | * | 6/1976 | McCormick .............. 180/19.1 |
| 4,077,731 | * | 3/1978 | Holz, Sr. et al. .............. 180/19.1 |
| 4,260,290 | * | 4/1981 | Flippin .............. 405/181 |
| 4,269,450 | * | 5/1981 | Welborn .............. 180/19.1 |
| 4,475,604 | | 10/1984 | Albertson et al. . |
| 5,039,252 | | 8/1991 | Schuermann . |
| 5,320,451 | * | 6/1994 | Garvery et al. .............. 405/180 |
| 5,431,444 | * | 7/1995 | Kenealy .............. 180/19.1 |
| 5,465,801 | * | 11/1995 | Hoover .............. 180/19.1 |
| 5,489,000 | * | 2/1996 | Hillborn .............. 180/19.1 |
| 5,653,096 | * | 8/1997 | Edwards .............. 56/16.7 |
| 5,878,827 | * | 3/1999 | Fox .............. 180/19.1 |
| 5,966,914 | * | 10/1999 | Reents .............. 56/16.7 |
| 6,065,555 | * | 5/2000 | Yuki et al. .............. 180/19.1 |

FOREIGN PATENT DOCUMENTS

900584 * 12/1943 (FR) .............. 405/180

OTHER PUBLICATIONS

Ditch Witch Model 100sx Operator's Manual, P/N 054–406, The Charles Machine Works, Inc. Issue No. 3/OP–6/94 (1994).

Ditch Witch 100sx Parts and Service Manual, P/N 050–673, The Charles Machine Works, Inc. Issue No. 8/PL—11/96 (1996).

* cited by examiner

Primary Examiner—Robert E. Pezzuto
Assistant Examiner—Alexandra K. Pechhold
(74) Attorney, Agent, or Firm—Collard & Roe, P.C.

(57) ABSTRACT

A turnable self-propelled, walk-along tractor vehicle, such as a plow for burying tubing is provided. The tractor vehicle has a pair of drive wheels rotatably mounted on a fixed axle in the front of the vehicle, a back support means, a U-shaped turning bracket mounted to the sides of the tractor vehicle, and optionally a vibrating blade for cutting a trench in the earth coupled at the rear of the vehicle. The back support means is mounted to the tractor vehicle at a first position elevated with respect to the ground and is adapted to engage the ground at a second position when downward force is applied to the turning bracket. The turning bracket comprises first and second portions, which may be flat or tubular in shape, which extend rearwardly from the sides of the tractor vehicle and substantially horizontally with respect to the ground when the back support means is in the first position. A third portion, which also may be flat or tubular in shape, extends perpendicular to and has juncture lines with the first and second portions. The lengths of the first and second portions are such that, by applying downward force to the third portion, the center of gravity of the tractor vehicle is shifted to lift the drive wheels from engagement with the earth and enable the vehicle to pivot on the back support means against the ground to effect a turn. In another embodiment, the tractor is equipped with pivot wheels to assist in turning the plow.

8 Claims, 3 Drawing Sheets

TURNABLE TRACTOR VEHICLE HAVING FIXED AXLE

BACKGROUND OF THE INVENTION

1. Field of the Invention

The present invention relates to construction machinery and, more particularly, to self-propelled tractor vehicles, such as plows used to bury tubing, for example irrigation tubing, which are equipped with a U-shaped bracket to facilitate turns during operation of the vehicle.

2. The Prior Art

At the present time there are a number of commercially available machines that have fixed axles, for example lawn mowers and vibratory plows which may be used for burying tubing, such as cable and flexible pipe. For example, one type of self-propelled, walk-along underground construction machine is the Ditch Witch® Model SX Plow available from the Charles Machine Works, Inc., Perry, Okla. See also U.S. Pat. Nos. 4,475,604 and 5,039,252. These machines are generally difficult or impossible to turn because the drive wheels are mounted on a fixed axle.

OBJECTIVES AND FEATURES OF THE INVENTION

It is an objective of the present invention to provide a tractor vehicle such as a tube-burying plow, lawn mower or other vehicle having drive wheels mounted on a fixed axle, equipped with a U-shaped bracket which permits easy turning, so that the vehicle may be turned by the operator, for example, by 90 degrees.

It is a further objective of the present invention to provide such a bracket which may be formed of an inexpensive material, such as steel piping, and yet will provide a ready means to facilitate turning of a self-propelled, walk-along tractor vehicle.

It is a further feature of the present invention to provide such a bracket which may be used with the Ditch Witch® Model 100 SX underground construction machine.

It is a further objective of the present invention to equip a tractor vehicle with such a bracket which permits a person operating the vehicle, even if not skilled, to make a smooth, sharp turn of the vehicle.

It is a further objective of the present invention to provide such a bracket which may be readily fitted to various types of tube-burying plows, lawn mowers and other tractor vehicles without modification to the drive motor of the machine.

It is a further objective of the present invention to provide a plow equipped with such a bracket which may be turned while operating in a variety of soil conditions.

It is a further objective of the present invention to provide such a bracket which is especially designed for use with vibratory plows for making a trench in the earth into which a cable is continuously led.

It is a feature of the present invention to provide a turnable, self-propelled tractor vehicle such as a walk-along plow for burying tubing. The vehicle has a pair of drive wheels rotatably mounted on a fixed axle in front of the vehicle, and optionally a vibratory plow with a blade for cutting a trench in the earth coupled at the rear of the vehicle. A back support means, such as a pair of wheels, is mounted to the tractor vehicle and a U-shaped turning bracket is mounted to the sides of the tractor vehicle. The back support means has a first position elevated with respect to the ground and a second position engaging the ground when downward force is applied to the U-shaped turning bracket. The U-shaped turning bracket, which may be formed from steel pipe of a diameter between 1 and 1¼ inches, has first and second portions, which may be flat or tubular in shape, extending rearwardly from the sides of the tractor vehicle and substantially horizontally with respect to the ground when the back support means is in the first position. For example, the first and second portions may be welded to the sides of the tractor vehicle. A third portion, which also may be flat or tubular in shape, is arranged perpendicular to the first and second portions and has juncture lines with the first and second portions.

The length of the first and second portions are such relative to the tractor vehicle, that by applying downward force to the third portions, the center of gravity of the tractor vehicle is shifted to lift the drive wheels from engagement with the earth and enable the vehicle to pivot on the back support means against the ground to effect a turn. Preferably, the first and second portions are the same length and the ratio of the length of the first portion to the third portion is in the range of 2:1 to 5:1.

It is a further feature of the present invention to provide a frame mounted to the rear of the tractor vehicle and a pair of pivot wheels pivotally mounted to the frame to pivot the vehicle about the wheels to effect a turn upon application of downward force. Preferably, the pivot wheels are mounted to the frame so as to engage the earth only upon application of downward force to the U-shaped turning bracket to effect a turn of at least 90 degrees.

SUMMARY OF THE INVENTION

The invention relates to a turnable self-propelled, tractor vehicle, preferably a walk-along vibratory plow for burying tubing, having a pair of drive wheels rotatably mounted on a fixed axle in the front of the vehicle, a back support means, and a U-shaped turning bracket preferably formed of steel pipe of a diameter between 1 and 1¼ inches. The bracket has two portions which are preferably parallel to each other and a third portion which is perpendicular to them. Each portion may be flat or tubular in shape and preferably the ratio of the length of the first portion to the third portion is in the range of 2:1 to 5:1. The length of the first and second portions are such that a user, for example, a construction worker installing underground irrigation tubing, is able to shift the center of gravity of the tractor vehicle by applying downward force to the third portion and pivot the vehicle against the ground to effect a turn.

Additional details of the invention are contained in the following detailed description and the attached drawings, in which preferred embodiments are illustrated by way of example.

BRIEF DESCRIPTION OF THE DRAWINGS

Other objects and features of the present invention become apparent from the following detailed description considered in conjunction with the accompanying drawings which disclose an embodiment of the present invention. It should be understood, however, that the drawings are designed for the purpose of illustration only, not as a definition of the limits of the invention, and the dimensions contained in the drawings may not be to scale.

In the drawings, wherein similar reference characters denote similar elements throughout the several views.

DETAILED DESCRIPTION OF PREFERRED EMBODIMENTS

Figure 1:
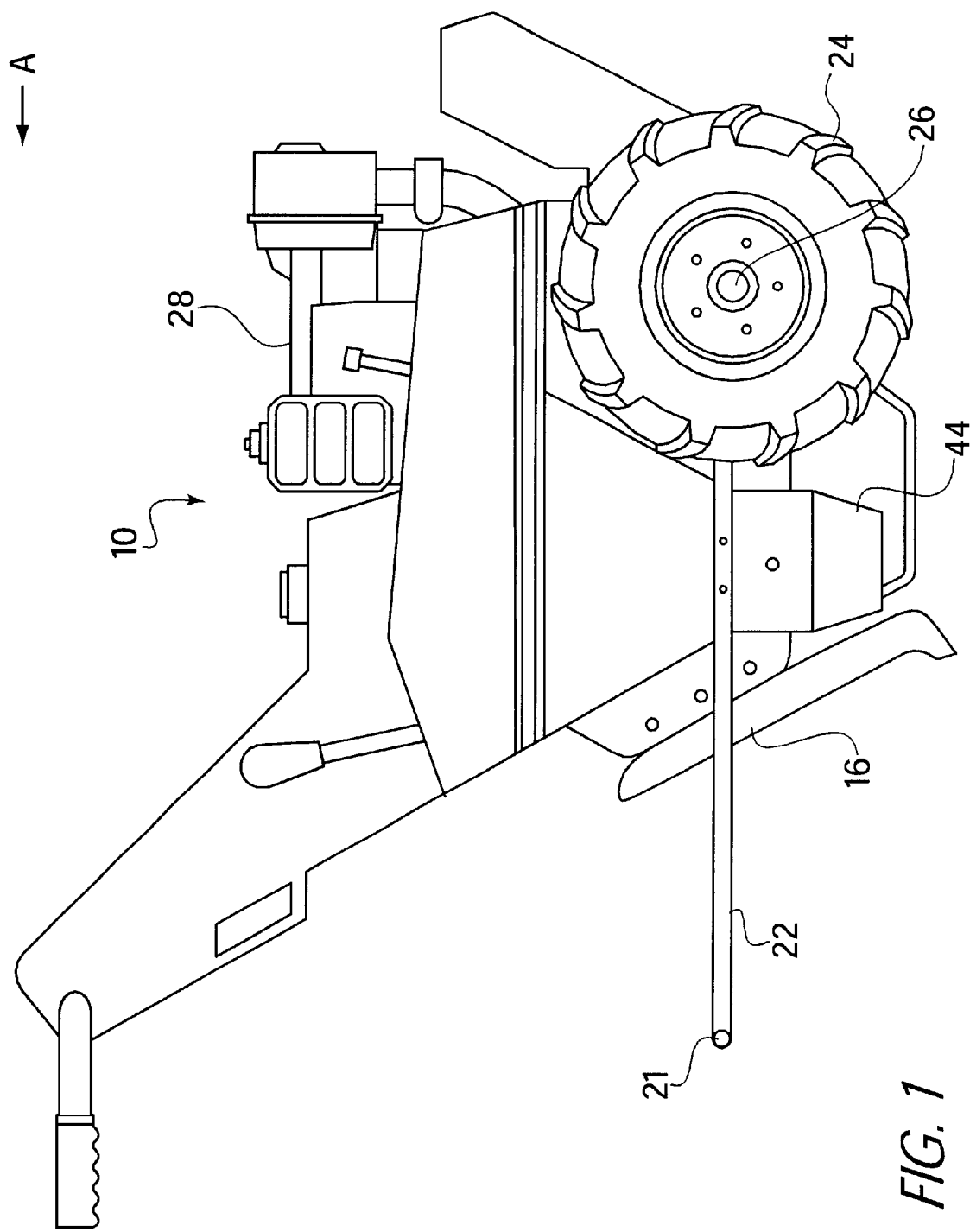
FIG. 1 is a side elevation view of an embodiment of the present invention wherein the tractor vehicle comprises a vibratory plow for burying tubing.

Turning now in detail to the drawings, FIG. 1 shows the turnable, self-propelled, walk-along tractor vehicle of the present invention equipped with a U-shaped turning bracket. The bracket is preferably formed as a one-piece unitary member, for example, by bending steel pipe of one (1) to one and one-quarter (1¼) inches diameter. Alternatively, the bracket portions may be joined by welding. Other materials may also be used to form the bracket. The bracket may be plated, for example, chrome-plated, or may be painted. Preferably, bracket 22 is formed with a nonslip surface so that an operator's foot will not slip when downward pressure is applied.

Figure 2:
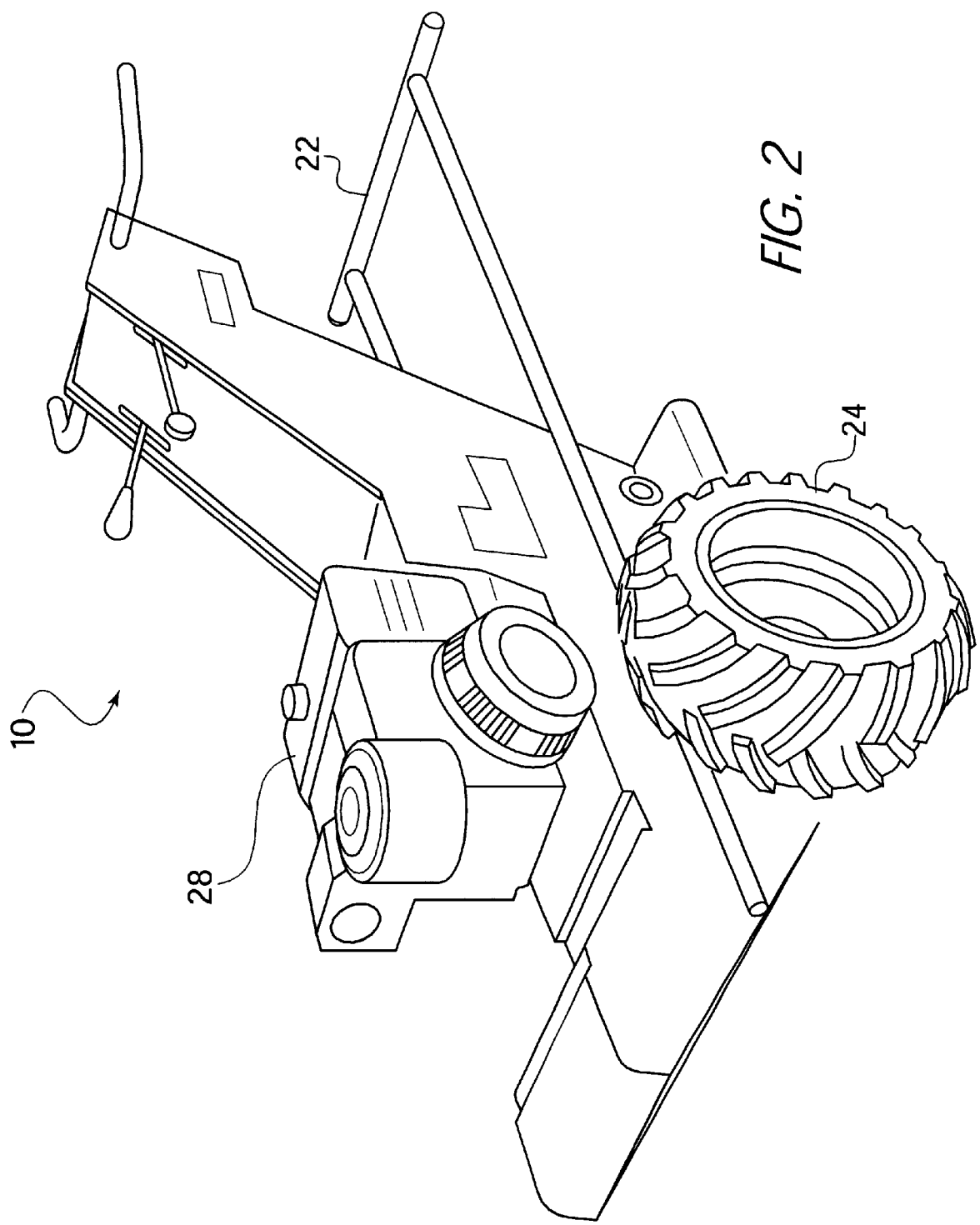
FIG. 2 is a front perspective view of the embodiment of FIG. 1 looking in the direction of arrow "A" of FIG. 1, with the vibratory blade not shown for illustration purposes.

The vehicle 10 of a first embodiment is shown with optional vibratory blade 16 for cutting a trench in the earth coupled at the rear of vehicle 10 in FIGS. 1–2 and consists of a back support means 44 mounted at the bottom of vehicle 10, and a U-shaped turning bracket 22 mounted to the sides of tractor vehicle 10. Preferably, bracket 22 is mounted 6 to 12 inches off the ground to facilitate the application of downward force by the foot of the operator of vehicle 10. Preferably, bracket 22 is equipped with extensions 21 which the operator may use to place his or her foot when making turns.

The tractor vehicle 10 comprises a pair of drive wheels 24 (one shown in FIG. 1) rotatably mounted on fixed axle 26 in the front of vehicle 10. Tractor vehicle 10 has a gasoline or diesel engine 28 or other suitable power source. Preferably drive wheels 24 are equipped with rubber tires. U-shaped turning bracket 22 is preferably mounted to the sides of tractor vehicle 10 just above fixed axle 26 to facilitate raising of drive wheels 24 off the ground during a turning operation.

Back support means 44 is mounted to tractor vehicle 10 at a first position elevated with respect to the ground as shown in FIG. 1 and is adapted to engage the ground at a second position when downward force is applied to bracket 22.

Figure 4:
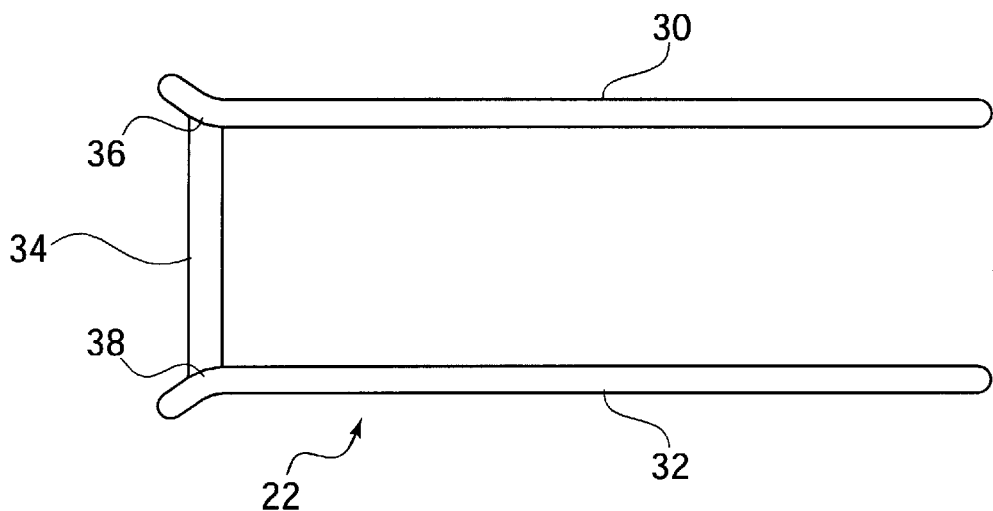
FIG. 4 is a side plan view of the U-shaped bracket incorporated in the vehicle of the present invention.

The bracket 22 is shown in FIG. 4 and comprises first and second portions 30, 32, which may be flat or tubular in shape, preferably extending generally parallel to each other and rearwardly from the sides of tractor vehicle 10 (see FIG. 1–2). First and second portions 30, 32 extend substantially horizontally with respect to the ground when back support means 44 is in the first position. A third portion 34, which is preferably flat, but also may be tubular in shape, extends generally perpendicular to first and second portions 30, 32 and joins them at their juncture lines 36, 38 respectively.

Bracket 22 may also be designed so that first and second portions 30, 32 extend beyond the juncture lines with portion 34 and curve outwardly at their rearward-most ends. This arrangement permits an operator to walk between the first and second portions 30, 32 while operating vehicle 10.

The length of first and second portions 30, 32 are such that by applying downward force to third portion 34, the center of gravity of tractor vehicle 10 is shifted to lift the drive wheels 24 from engagement with the earth and enable the vehicle to pivot on back support means 44 against the ground to effect a turn, for example, of at least 90 degrees.

Preferably, the length of first portion 30 is the same as second portion 32, and the ratio of the length of first portion 30 to third portion 34 is in the range of 2:1 to 5:1.

A typical length of portions 30, 32 is 3 to 6 feet, preferably 4.5 feet. The portions should not be so long as to interfere with the operator walking along behind vehicle 10.

Figure 3:
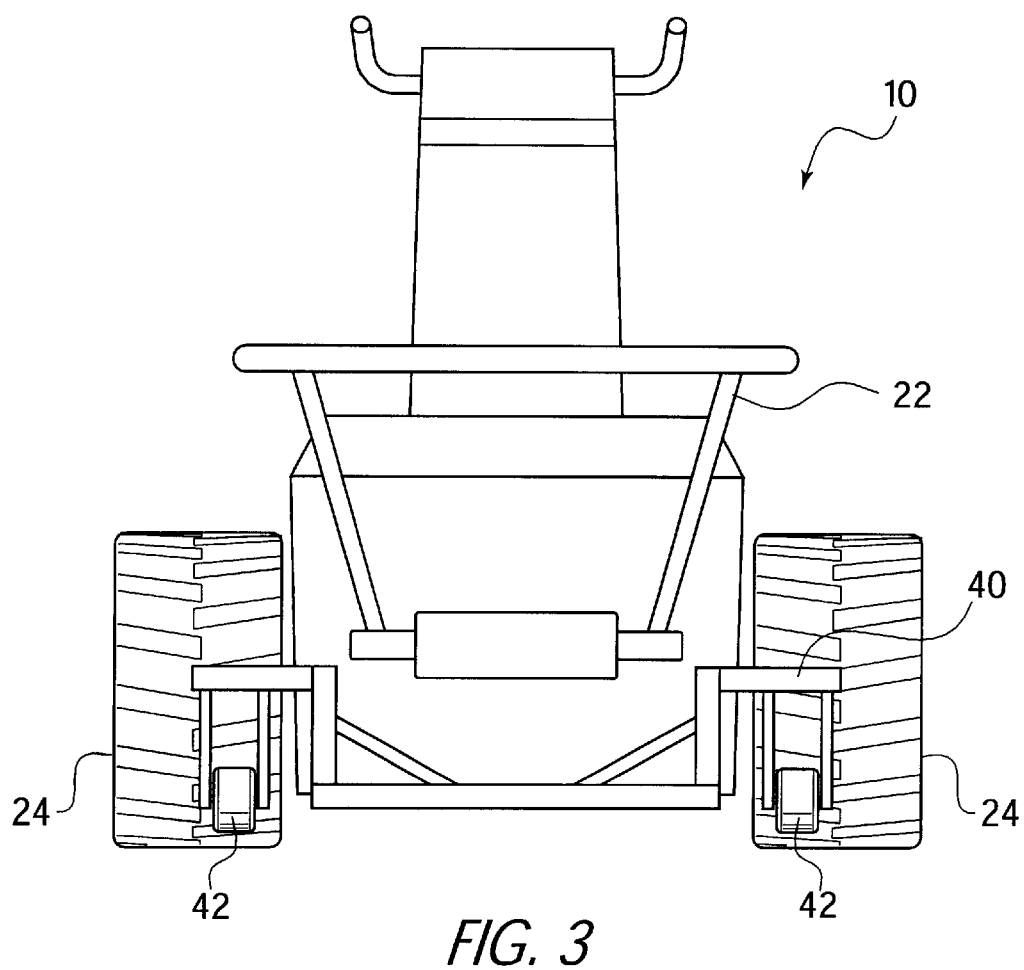
FIG. 3 is a rear view of a second embodiment of the present invention, showing vehicle 10 tilted forward to illustrate the underside of the bracket and pivot wheels.

In a second embodiment shown in FIG. 3, tractor vehicle 10 may be equipped with a frame 40 mounted to the rear of vehicle 10. A pair of pivot wheels 42 are pivotally mounted to frame 40. Preferably, pivot wheels 42 are mounted to frame 40 so as to engage the earth or ground only upon application of downward force to U-shaped turning bracket 22. Pivot wheels 42 are preferably mounted so that they just touch the ground without bearing any weight of vehicle 10 until downward force is applied. Upon application of downward force to bracket 22, vehicle 10 may be pivoted about pivot wheels 42 to effect a turn.

In operation, in the embodiment of FIGS. 1–2, the operator of vehicle 10 applies downward pressure, for example with his or her foot, to bracket 22 without turning off engine 28 of vehicle 10. The downward pressure causes the front of vehicle 10 to rise as it pivots upward from pivot point 44 at the base of vehicle 10. As the front of vehicle 10 pivots upward, drive wheels 24 are lifted from the ground and the entire vehicle can be pivoted at any angle, from 0 to 360 degrees, to effect a turn.

To facilitate left turns, the operator steps to the rightmost portion of bracket 22. Stepping at this location raises the left drive wheel 24 off the ground to a greater extent than the right drive wheel, which facilitates turning left. Similarly, to facilitate right turns, the operator steps to the left-most portion of bracket 22 which raises the right drive wheel 24 off the ground to a greater extent than the left drive wheel.

The embodiment of FIG. 3 is similarly pivoted. Downward pressure on bracket 22 causes wheels 42 to come in contact with the ground so that vehicle 10 may be pivoted and swung at any angle, from 0 to 360 degrees.

While several embodiments of the present invention have been shown and described, it is to be understood that many changes and modifications may be made thereunto without departing from the spirit and scope of the invention as defined in the appended claims.

What is claimed is:

1. In a self-propelled tractor vehicle with two wheels having a handle at an upper portion of the rear of the vehicle, an engine in the front of the vehicle, and said two wheels located in the front of the vehicle on a fixed motorized axle driven by the engine, the improvement comprising:

(a) a back support means fixed with respect to the vehicle and disposed behind and adjacent to the two wheels and mounted to a lower portion of the vehicle at a location above the lower most level of the wheels for allowing the vehicle to pivot backwards and supporting the vehicle when in contact with the ground; and (b) a fixed, stationary U-shaped turning bracket, separate from the handle, and mounted to the sides of the tractor vehicle adjacent to the ground above the level of said fixed axle and below the level of the handle, said bracket comprising first, second, and third portions, said first and second portions extending substantially horizontally with respect to the ground when the two wheels engage the ground, said third portion having juncture lines with said first and second portions at a location to the rear of the two wheels, and located between the handle and the back support means, wherein the length of the first and second portions are such that by applying downward force to the third portion, the center of gravity of the vehicle is shifted to lift the two wheels from engagement with the ground and enable the vehicle to pivot on the back support means against the ground to effect a turn of the vehicle.

2. A tractor vehicle as in claim 1 further comprising a frame mounted to the rear of the vehicle and the back support means comprises a pair of pivot wheels pivotally mounted to the frame such that upon application of downward force, the vehicle may be pivoted about the pivot wheels to effect a turn.

3. A tractor vehicle as in claim 2 further comprising a vibratory blade coupled at the rear of the vehicle for cutting a trench in the earth for burying tubing.

4. A tractor vehicle as in claim 1 wherein the first and second portions are tubular in shape and are welded to the sides of the tractor vehicle.

5. A tractor vehicle as in claim 1 wherein the U-shaped turning bracket is formed from steel pipe of a diameter between one and one and one quarter inches.

6. A tractor vehicle as in claim 1 wherein the ratio of the length of the first portion to the third portion is in the range of 2:1 to 5:1.

7. A tractor vehicle as in claim 1 wherein the vehicle may be pivoted to effect a turn of at least 90 degrees.

8. A method of turning a self-propelled tractor vehicle with two wheels having a handle at an upper portion of the rear of the vehicle, an engine in the front of the vehicle, and said two wheels located in the front of the vehicle on a fixed motorized axle driven by the engine, which comprises the steps of:

(a) disposing a back support means behind and adjacent to the two wheels and fixed with respect to the vehicle, said back support means being mounted to a lower portion of the vehicle at a location above the lowermost level of the wheels for allowing the vehicle to pivot backwards and supporting the vehicle when in contact with the ground;

(b) mounting a U-shaped turning bracket, separate from the handle, fixed and stationary to the sides of the vehicle adjacent to the ground above the level of said fixed axle and below the level of the handle, said bracket comprising first, second and third portions, said first and second portions extending substantially horizontally with respect to the ground when the two wheels engage the ground, said third portion having juncture lines with said first and second portions and extending perpendicular to the first and second portions at a location to the rear of the two wheels, and located between the handle and the back support means; and (c) applying downward force to the third portion of the bracket to shift the center of gravity of the vehicle and to pivot the vehicle on the back support means against the ground to turn the vehicle.

* * * * *